United States Patent
Inada et al.

(10) Patent No.: US 11,167,764 B2
(45) Date of Patent: Nov. 9, 2021

(54) VEHICLE CONTROL SYSTEM

(71) Applicant: HONDA MOTOR CO., LTD., Tokyo (JP)

(72) Inventors: Kyosuke Inada, Wako (JP); Fuyuki Hosokawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 42 days.

(21) Appl. No.: 16/369,385

(22) Filed: Mar. 29, 2019

(65) Prior Publication Data
US 2019/0299993 A1    Oct. 3, 2019

(30) Foreign Application Priority Data

Apr. 2, 2018  (JP) .............................. JP2018-071151

(51) Int. Cl.
*B60W 30/182*    (2020.01)
*B60R 25/10*    (2013.01)
(Continued)

(52) U.S. Cl.
CPC ............. *B60W 30/182* (2013.01); *B60Q 1/46* (2013.01); *B60Q 1/50* (2013.01); *B60Q 5/005* (2013.01); *B60R 25/1001* (2013.01); *B60T 8/1706* (2013.01); *G01C 21/26* (2013.01); *B60Q 1/54* (2013.01); *B60W 2050/146* (2013.01); *B60W 2552/00* (2020.02)

(58) Field of Classification Search
CPC ......... B60T 2210/16; B60W 2050/143; B60Q 1/46; B60Q 1/54
See application file for complete search history.

(56) References Cited

U.S. PATENT DOCUMENTS 7,626,494 B2 * 12/2009 Yamamoto .............. B60R 25/04
340/441
9,637,097 B2    5/2017 Oshima et al.
(Continued)

FOREIGN PATENT DOCUMENTS

JP    2006-188990    7/2006
JP    2006-229573    8/2006
(Continued)

OTHER PUBLICATIONS

Japanese Office Action for Japanese Patent Application No. 2018-071151 dated Oct. 1, 2019.
(Continued)

*Primary Examiner* — Kenneth J Malkowski
(74) *Attorney, Agent, or Firm* — Amin, Turocy & Watson, LLP

(57) ABSTRACT

A vehicle control system includes a control part in which a public road mode that is selected at a time of traveling on a public road and a non-public road mode of a setting that is suitable for a travel in a non-public road region are set as a travel mode, wherein the control part is configured to allow a safety protection component of a vehicle to perform a normal operation that is required at a time of traveling on a public road when the public road mode is selected and is configured to allow the safety protection component to perform an alarm operation that is different from the normal operation when the non-public road mode is selected.

14 Claims, 3 Drawing Sheets

(51) Int. Cl.
*B60T 8/17* (2006.01)
*G01C 21/26* (2006.01)
*B60Q 5/00* (2006.01)
*B60Q 1/46* (2006.01)
*B60Q 1/50* (2006.01)
*B60W 50/14* (2020.01)
*B60Q 1/54* (2006.01)

(56) References Cited

U.S. PATENT DOCUMENTS

| | | | |
|---|---|---|---|
| 2015/0016627 A1 | 1/2015 | Barlow, Jr. et al. | |
| 2016/0311444 A1* | 10/2016 | Oshima | B60W 10/20 |
| 2017/0225689 A1* | 8/2017 | Mukai | B60W 10/18 |
| 2017/0349093 A1* | 12/2017 | Peacock | B60Q 1/0088 |
| 2019/0248281 A1* | 8/2019 | Fushimi | B60Q 1/28 |

FOREIGN PATENT DOCUMENTS

| | | |
|---|---|---|
| JP | 2007-131284 | 5/2007 |
| JP | 2011-038315 | 2/2011 |
| JP | 2015-199382 | 11/2015 |

OTHER PUBLICATIONS

Extended European Search Report for European Patent Application No. 19165814.5 dated Sep. 19, 2019.

* cited by examiner

VEHICLE CONTROL SYSTEM

CROSS-REFERENCE TO RELATED APPLICATION

Priority is claimed on Japanese Patent Application No. 2018-071151, filed on Apr. 2, 2018, the contents of which are incorporated herein by reference.

BACKGROUND

Field of the Invention

The present invention relates to a vehicle control system.

Background

For example, Japanese Unexamined Patent Application, First Publication No. 2015-199382 discloses a method and an apparatus for identifying a circuit. Specifically, Japanese Unexamined Patent Application, First Publication No. 2015-199382 discloses that by recognizing a characteristic object such as a center divider by using a camera or the like in addition to position information of the GPS, a general road and a circuit are determined with good accuracy. When it is determined that a vehicle is positioned within a circuit, unlocking of a variety of functions for safety setting such as the ABS, fuel saving, and the like is permitted.

SUMMARY

The related art described above is a technique that acquires the position of the vehicle with good accuracy and thereby prevents a problem such as that a circuit mode (non-public road mode) is selected erroneously on a general road or that it is impossible to select the circuit mode on a circuit from occurring. On the other hand, the related art described above does not disclose a matter after ending a circuit travel. That is, after ending the circuit travel, it is necessary to prevent the vehicle from going to a general road while erroneously maintaining the circuit mode. However, it is not efficient to add a configuration that is dedicated to an alarm which indicates that the vehicle is in the circuit mode.

An aspect of the present invention provides a vehicle control system capable of allowing a driver to know that a vehicle is in a non-public road travel mode while preventing the number of configurations from being increased.

(1) An aspect of the present invention is a vehicle control system capable of switching a travel mode of a vehicle, the vehicle control system including a control part in which a public road mode that is selected at a time of traveling on a public road and a non-public road mode of a setting that is suitable for a travel in a non-public road region are set as the travel mode, wherein the control part is configured to allow a safety protection component of the vehicle to perform a normal operation that is required at a time of traveling on a public road when the public road mode is selected and is configured to allow the safety protection component to perform an alarm operation that is different from the normal operation when the non-public road mode is selected.

(2) In the above vehicle control system, the alarm operation of the safety protection component may be an operation that is configured to visually or in an auditory manner notify at least one of the group consisting of a driver and vehicle surroundings of an abnormality.

(3) In the above vehicle control system, the alarm operation of the safety protection component may continue during selecting the non-public road mode.

(4) In the above vehicle control system, the safety protection component may include at least one of the group consisting of a winker, a horn, a meter, a headlight, a stop lamp, and a tail lamp.

(5) In the above vehicle control system, the alarm operation may include at least one of the group consisting of an intermittent operation of the horn and a blinking operation of at least one of the group consisting of the winker, the meter, the headlight, the stop lamp, and the tail lamp.

(6) In the above vehicle control system, the alarm operation may include at least one of the group consisting of blinking the winker alternately from side to side and turning off or blinking a vehicle speed display of the meter.

(7) The above vehicle control system may include a smart key system that is configured to perform a communication between the vehicle and a smart key which is portable by a driver and perform locking and unlocking of each part of the vehicle based on a result of the communication, wherein the control part may determine whether or not selection of the non-public road mode is permitted in accordance with a reception situation of a radio wave that is emitted by the smart key.

(8) In the above vehicle control system, the control part may permit the selection of the non-public road mode at a time of traveling in a situation in which the radio wave that is emitted by the smart key is not received.

(9) In the above vehicle control system, the control part may permit the selection of the non-public road mode when the radio wave that is emitted by the smart key is not received for a certain period of time.

(10) In the above vehicle control system, the control part may permit the selection of the non-public road mode when stopping in a situation in which the radio wave that is emitted by the smart key is not received.

(11) In the above vehicle control system, the control part may set the travel mode to the public road mode when a main switch of the vehicle is turned off.

(12) In the above vehicle control system, when an engine is stopped at a time of traveling in the non-public road mode, the control part may permit a restart of the engine by at least one of the group consisting of a prescribed state and a prescribed operation regardless of a reception situation of a radio wave of the smart key.

According to the above configuration (1), by using an existing safety protection component, it is possible to announce that the vehicle is selecting the non-public road mode without using a novel component (without increasing the number of components). Therefore, it is possible to prompt the driver and surrounding people to become aware that the vehicle is in the non-public road mode and to prevent erroneously traveling on the public road in the non-public road mode.

According to the above configuration (2), not only the driver but also the vehicle surroundings are notified of the abnormality, and thereby, it is possible to effectively prevent erroneously traveling on the public road in the non-public road mode.

According to the above configuration (3), the alarm operation of the safety protection component is continued during selecting the non-public road mode, and thereby, it is possible to further effectively prevent erroneously traveling on the public road in the non-public road mode.

According to the above configuration (4), without using a novel component (without increasing the number of components), by using an existing safety protection component, it is possible to widely announce that the vehicle is selecting the non-public road mode.

According to the above configuration (5), it is possible to further clearly announce that the vehicle is selecting the non-public road mode by the intermittent operation or the blinking operation of the safety protection component.

According to the above configuration (6), by performing an alarm operation that is obviously different from the normal operation of the safety protection component, it is possible to still further clearly announce that the vehicle is selecting the non-public road mode.

According to the above configuration (7), by using existing vehicle equipment (the smart key), without using a novel component (without increasing the number of components), it is possible to prevent erroneously traveling on the public road in the non-public road mode.

According to the above configuration (8), by permitting the selection of the non-public road mode in a situation in which the smart key possessed at the time of starting the engine is left to be away from the vehicle (that is, in a situation which is impossible at the time of traveling on the public road), it is possible to prevent the driver from erroneously selecting the non-public road mode during traveling on the public road. Further, since it is possible to release the smart key at the time of traveling on the non-public road, it is possible to further comfortably travel without carrying personal belongings at the time of traveling on the non-public road.

According to the above configuration (9), when the radio wave that is emitted by the smart key is not received temporarily due to a radio wave transmission failure of the smart key, the effect of external environments, and the like, it is possible to prevent the selection of the non-public road mode from being permitted erroneously.

According to the above configuration (10), by permitting the switching to the non-public road mode when the traveling vehicle stops in a situation in which the radio wave that is emitted by the smart key is not received, it is possible to further safely perform a switching operation of the travel mode.

According to the above configuration (11), since the non-public road mode is released simultaneously with turning off of the main switch even when the non-public road mode is not released by a switch operation or the like, it is possible to save the time and effort for releasing the non-public road mode, and it is possible to prevent traveling in the non-public road mode erroneously at the time of restarting after turning off the main switch.

According to the above configuration (12), even if the smart key is not carried when the engine is stopped due to falling or the like during traveling in the non-public road mode, for example, by performing a prescribed operation within a predetermined period of time, it is possible to restart the engine and travel. Further, since it is impossible to restart the engine by a state (for example, after the predetermined period of time) other than the prescribed state and/or by an operation other than the prescribed operation, even when the driver is away from the vehicle of which the engine is stopped in the non-public road mode, it is possible to prevent a third party from restarting the engine and to obtain an antitheft property.

DESCRIPTION OF THE EMBODIMENTS

Hereinafter, an embodiment of the present invention will be described with reference to the drawings.

Figure 1:
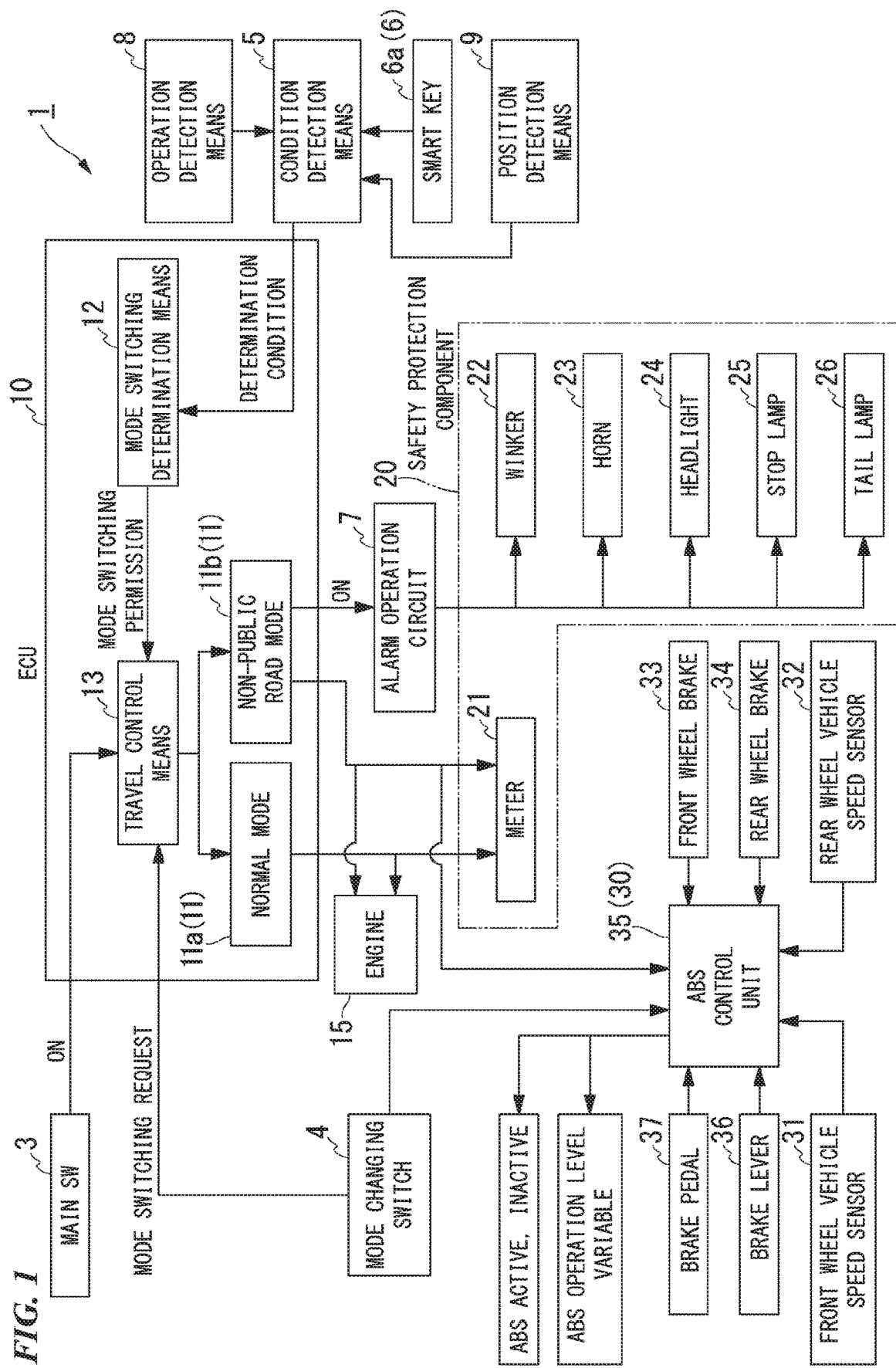
FIG. 1 is a functional block diagram of a vehicle control system according to an embodiment of the present invention.
Figure 3:
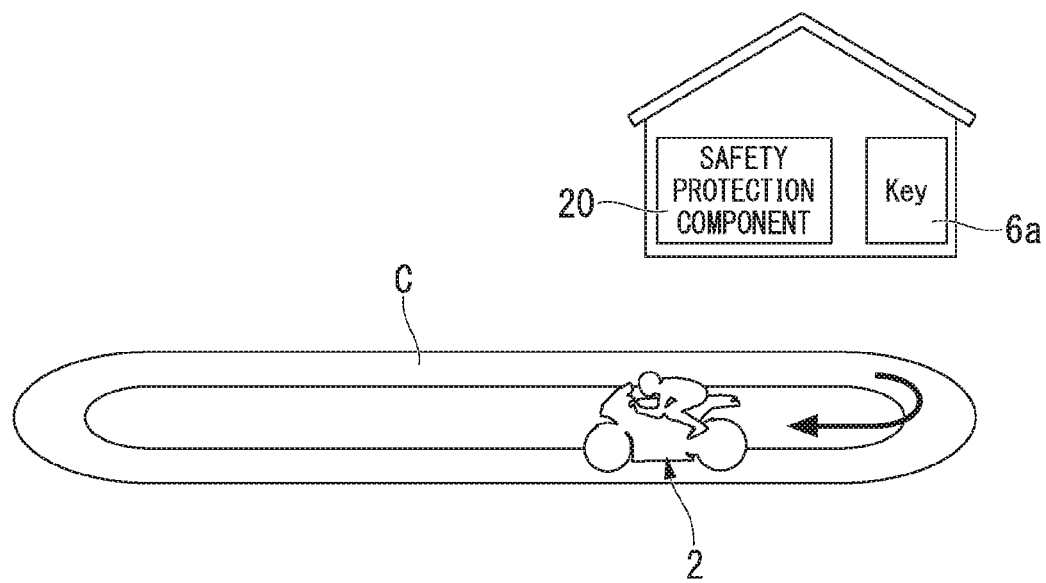
FIG. 3 is a view when a motorcycle applied with the vehicle control system travels on a circuit.
Figure 4:
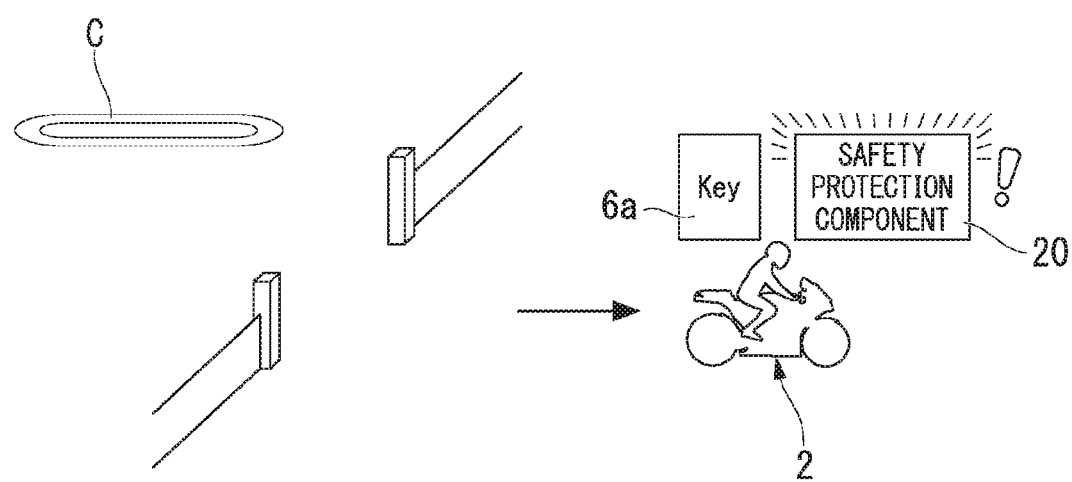
FIG. 4 is a view after the motorcycle applied with the vehicle control system travels on the circuit.

As shown in FIG. 1, FIG. 3, and FIG. 4, a vehicle control system 1 of the present embodiment is applied, for example, to a control system of a motorcycle 2 (vehicle). The motorcycle 2 is a vehicle that includes a safety protection component 20 and is capable of traveling on a public road. The motorcycle 2 is a sport-type vehicle, for example, in consideration of traveling on a circuit C.

With reference to FIG. 1, the vehicle control system 1 controls a variety of vehicle configurations by a control part 10 and thereby switches a travel mode 11. The travel mode 11 includes a normal mode (or a public road mode) 11a for traveling on a public road and a non-public road mode 11b for traveling in a non-public road region such as the circuit C.

The normal mode 11a activates, for example, operations of safety equipment such as an ABS (Anti-lock Brake System), a CBS (Combined Brake System), an automatic brake, and a steering assist, fuel efficiency improvement devices such as an idling stop and a fuel limit, a speed limiter such as an ignition cut and a fuel cut, and other law observation devices. Further, the normal mode 11a performs a normal operation that is required at the time of traveling on a public road in the safety protection component 20 by an operation of a driver (user).

On the other hand, the non-public road mode 11b cancels or enables arbitrary cancelling of the operations of the variety of devices including the safety equipment. Further, the non-public road mode 11b allows the safety protection component 20 to perform a prescribed alarm operation that is different from the normal operation independently of the operation of the driver.

With reference to FIG. 3 and FIG. 4, the circuit C which is a non-public road region is an athletic facility for performing a motor sport and is a generic term including a loop course and accompanying facilities. The circuit C is a name that is generally used for paved road facilities but also includes an unpaved road. The non-public road region is not limited to the athletic circuit C and may be, for example, a test course.

As shown in FIG. 1, the vehicle control system 1 of the present embodiment includes a main switch 3, the control part 10, an ABS 30, a mode changing switch 4, a mode switching condition detection means 5, a smart key system 6, and an alarm operation circuit part 7.

The control part 10 is an ECU (Electric Control Unit) and functions as a control part 10 of the entire control system 1. An ON signal from the main switch 3, a mode switching request signal from the mode changing switch 4, and a condition signal from the mode switching condition detection means 5 are input to the control part 10.

The control part 10 determines whether or not switching of the travel mode 11 is permitted on the basis of a variety of input information and performs switching of the travel mode 11 in response to a switching request of the travel mode 11. The control part 10 controls the meter 21 and the alarm operation circuit part 7 in accordance with the selected travel mode 11.

The control part 10 allows the meter 21 to perform a display in accordance with the public road mode 11a and the non-public road mode 11b. The meter 21 includes, for example, a liquid crystal panel as a display part. At least vehicle speed information is displayed on the liquid crystal panel. In the public road mode 11a, the meter 21 performs a prescribed display that includes a speed display and that is mandatory by the law. In the non-public road mode 11b, the meter 21 performs, for example, a display (for example, a text display, a blinking display of a lamp, and the like) which indicates that the current travel mode 11 is the non-public road mode 11b. Further, in the non-public road mode 11b, the meter 21 allows at least one (for example, a vehicle speed display) of the prescribed display to disappear or blink. Thereby, it is possible to allow the driver to know that the travel mode 11 is the non-public road mode 11b.

The control part 10 turns on the alarm operation circuit part 7 when the non-public road mode 11b is selected. The alarm operation circuit part 7 allows a variety of connected safety protection components 20 to perform an alarm operation that is different from a normal operation by the operation of the driver. For example, the alarm operation circuit part 7 repeats blinking of a headlight 24, a stop lamp 25, and a tail lamp 26, allows right and left winkers 22 to blink alternately, or allows a horn 23 to honk. Thereby, it is possible to notify the driver and people around the vehicle of that the travel mode 11 is the non-public road mode 11b.

The ABS 30 is an example of the variety of devices that are cancelled or that are able to be cancelled at the time of the non-public road mode 11b. The ABS 30 operates an ABS control unit 35 and performs a control that intervenes operations of front and rear wheel brakes 33, 34 on the basis of detection information of front and rear wheel speed sensors 31, 32. In a case where a slip of a wheel is detected when the front and rear wheel brakes 33, 34 are operated or the like, the ABS 30 works so as to recover a grip of the wheel. At the time of the slip of the wheel, the ABS 30 repeats a decrease and an increase of the brake oil pressure of the front and rear wheel brakes 33, 34 and recovers the grip of the wheel while keeping a brake lever 36 and a brake pedal 37 being operated.

The ABS 30 is always effective at the time of the normal mode 11a.

In the ABS 30, at the time of the non-public road mode 11b, switching (for example, an intervention control to the front wheel and/or the rear wheel is turned off) between operation and non-operation is able to be performed by the operation of the mode changing switch 4, and an operation level (intervention sensitivity) becomes switchable.

The mode changing switch 4 is an operation part for performing switching of the travel mode 11. Further, at the time of the non-public road mode 11b, the mode changing switch 4 enables arbitrary cancellation of the operation of the safety equipment such as the ABS 30 and enables arbitrary adjustment of the operation level of the safety equipment.

For example, when existing as hardware such as a switch that is provided on a handle, the mode changing switch 4 becomes inoperable or invalid in the public road mode 11a and becomes operable or valid in the non-public road mode 11b. The mode changing switch 4 may be, for example, an operation part that is displayed on a touch panel such as the meter 21 at the time of the non-public road mode 11b.

The mode switching condition detection means 5 collects conditions for determining whether or not switching of the travel mode 11 is permitted at the time of the non-public road mode 11b. For example, detection information from an operation detection means that directly detects the motion of a vehicle configuration at the time of traveling such as a wheel speed sensor of the ABS 30 is input to the mode switching condition detection means 5. Further, detection information from a position detection means 9 that detects the position of the vehicle by using an external communication with a GPS (Global Positioning System) or the like is input to the mode switching condition detection means 5. Further, detection information of whether or not a smart key 6a is within an authentication area of the motorcycle 2 is input to the mode switching condition detection means 5. The mode switching condition detection means 5 transmits a variety of input information to the control part 10.

The control part 10 includes a mode switching determination means 12 and a travel control means 13.

The mode switching determination means 12 determines whether or not switching of the travel mode 11 is permitted at the time of the non-public road mode 11b. A variety of information that are transmitted from the mode switching condition detection means 5 are input as a determination condition to the mode switching determination means 12. The mode switching determination means 12 determines whether or not it is possible to switch the travel mode of the motorcycle 2 from the normal mode 11a to the non-public road mode 11b on the basis of the variety of input information. The mode switching determination means 12 transmits a mode switching permission command to the travel control means 13 when determining that switching to the non-public road mode 11b is possible.

At the time of the main switch 3 being turned on and in a state where the mode switching permission command is received from the mode switching determination means 12, the travel control means 13 accepts a switching request of the travel mode 11 by the mode changing switch 4. That is, the travel control means 13 switches the travel mode of the motorcycle 2 from the normal mode 11a that is adapted for traveling on the public road to the non-public road mode 11b that is adapted for traveling in the non-public road region such as the circuit in response to the switching request to the non-public road mode 11b.

In the public road mode 11a, the meter 21 performs a prescribed display in conformity to the law and the like, and the safety protection component 20 performs a prescribed normal operation in response to the operation of the driver. In the non-public road mode 11b, for example, the meter 21 displays that the travel mode 11 is the non-public road mode 11b and/or allows a speed display to disappear, and the safety protection component 20 performs an alarm operation that is different from the normal operation.

Each of the means described above that are included in the control part 10 is realized, for example, by executing a program but may be constituted as hardware including one or more electric components.

The smart key system 6 performs an interactive communication between the smart key (portable device) 6a that is possessed by driver and a smart unit (in-vehicle device, not shown) that is mounted on the motorcycle 2 and enables starting of the engine 15 and releasing of the lock of each part of the vehicle when the ID of the smart key 6a is authenticated. The starting of the engine 15 is performed by an operation of an operation element such as a knob or a button in the main switch 3. The operation (engine start) of the main switch 3 becomes possible or valid (unlocked state)

by the ID authentication of the smart key 6a and becomes impossible or invalid (locked state) by the smart key 6a being separated and the communication being cut off. Examples of the equipment that is locked and unlocked by the smart system include a handle lock, a seat lock, a storage lid lock, a fuel lid lock, and the like.

When a transmission/reception circuit of radio waves of the smart key 6a is in an ON state, and the smart key 6a enters a prescribed authentication area, the smart key system 6 communicates with the smart key 6a and performs the authentication. The authentication area is, for example, a range having a radius of about 2 m and having a vehicle body center as a base point. When the smart key 6a is authenticated, the main switch 3 becomes operable, and a lock device of each part of the vehicle is unlocked.

When the smart key 6a leaves the authentication area, or when the transmission/reception circuit of the smart key 6a is turned off, the smart key system 6 stops the communication with the smart key 6a.

Thereby, the main switch 3 becomes inoperable, and the lock device of each part of the vehicle is locked.

Figure 2:
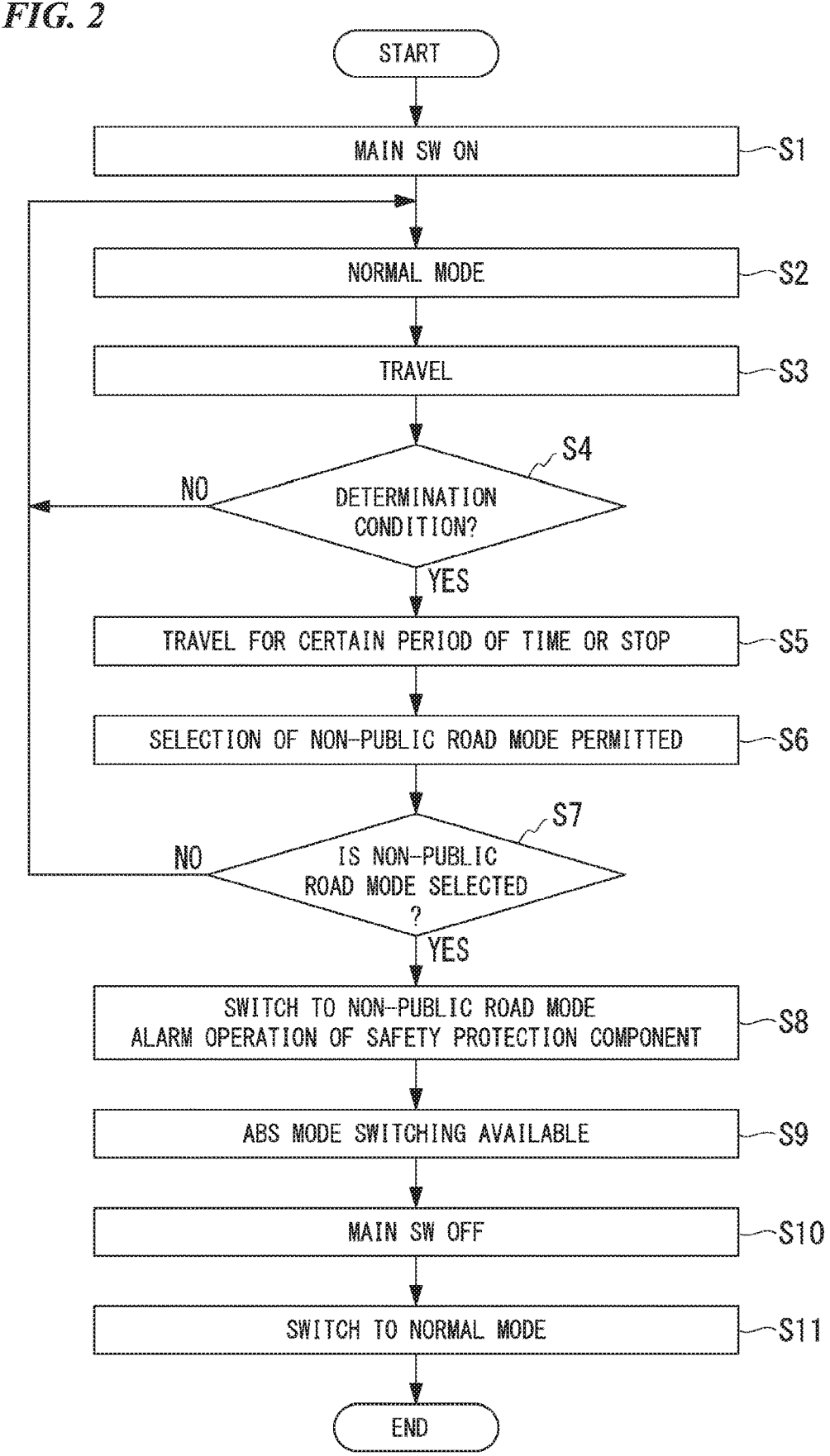
FIG. 2 is a flowchart showing a process of the vehicle control system.

Next, a process that is performed before the non-public road mode 11b is selected in the vehicle control system 1 is described with reference to a flowchart of FIG. 2.

First, when the smart key 6a is carried by the driver or the like and is within the authentication area, the main switch 3 of the motorcycle 2 is turned on (Step S1). When the main switch 3 is turned on, electric power is supplied to the control part 10, and the process is started. At the time of starting the control part 10, the travel mode 11 is in a state where the normal mode 11a is selected (Step S2).

Next, the motorcycle 2 starts traveling by using a motor such as the engine 15 (Step S3). When the motor of the motorcycle 2 is the engine (internal combustion engine) 15, after starting the engine 15, the motorcycle 2 starts traveling. Whether the motorcycle 2 is in a travel state is determined, for example, by the detection information from the operation detection means.

With reference also to FIG. 3, when the motorcycle 2 travels on the circuit C (non-public road region), after turning on the main switch 3 and starting the engine 15, the driver leaves a baggage that includes the smart key 6a and a detached safety protection component 20 to the facility. The driver may turn off transmission/reception circuit and carry the smart key 6a. In both cases, when the motorcycle 2 travels on the circuit, the motorcycle 2 is in a state of not receiving the radio waves of the smart key 6a.

Next, the mode switching determination means 12 of the control part 10 determines whether or not switching (selection of the non-public road mode 11b) of the travel mode 11 is permitted (Step S4). Specifically, the mode switching determination means 12 determines whether or not a condition (non-public road travel determination condition) for determining that the motorcycle 2 is traveling in the non-public road region is satisfied. The non-public road travel determination condition is that the motorcycle 2 is during traveling and that the motorcycle 2 does not receive the radio waves of the smart key 6a.

Step S4 is a step after the motorcycle 2 starts traveling. Accordingly, in Step S4, the mode switching determination means 12 determines whether or not the motorcycle 2 is in a state of not receiving the radio waves of the smart key 6a. When the non-public road travel determination condition is satisfied (YES in Step S4), the mode switching determination means 12 proceeds to Step S5. When the determination is NO in Step S4, the routine returns to Step S2.

That is, when the motorcycle 2 is traveling on the public road, the driver always carries the smart key 6a, and the motorcycle 2 does not become the state of not receiving the radio waves of the smart key 6a. On the other hand, when the motorcycle 2 is traveling in the non-public road region, the smart key 6a is at a place that is away from the motorcycle 2, or the transmission/reception circuit of the smart key 6a is turned off, and the motorcycle 2 is in a state of not receiving the radio waves of the smart key 6a. Accordingly, the mode switching determination means 12 uses that the motorcycle 2 is in a state of not receiving the radio waves of the smart key 6a as the non-public road travel determination condition.

In Step S5, the mode switching determination means 12 confirms either that the motorcycle 2 travels for a certain period of time (for example, about 10 seconds) in a state of not receiving the radio waves of the smart key 6a or that the motorcycle 2 stops and then permits selection of the non-public road mode 11b (Step S6). At this time, the mode switching determination means 12 transmits the mode switching permission command to the travel control means 13.

By confirming the state of not receiving the radio waves of the smart key 6a for the certain period of time, an erroneous determination due to a temporary transmission/reception error of the radio waves of the smart key 6a is prevented. Further, by confirming the stop of the motorcycle 2, the switching operation of the travel mode 11 being performed during traveling of the motorcycle 2 is prevented.

The mode switching determination means 12 may use at least one of not receiving the radio waves of the smart key 6a and that the motorcycle 2 is in the prescribed non-public road region from the detection information of the position detection means 9 as the non-public road travel determination condition.

After receiving the mode switching permission command, the travel control means 13 determines whether or not the switching request of the travel mode 11 is submitted (Step S7). That is, it is determined whether or not the non-public road mode 11b is selected by the mode changing switch 4. When the non-public road mode 11b is selected (YES in Step S7), the routine proceeds to Step S8. When the determination is NO in Step S7, the routine returns to Step S2.

With reference also to FIG. 4, in Step S8, the control part 10 controls the meter 21 and the alarm operation circuit part 7 and allows the safety protection component 20 that includes the meter 21 to perform the alarm operation that is different from the normal operation. The alarm operation includes switching (disappearance of a speed display, blinking of a mode display, and the like) of the display screen of the meter 21, alternate blinking of the right and left winkers 22, an intermittent operation of the horn 23, blinking of the headlight 24, blinking of the tail lamp 26 and the stop lamp 25, and the like. By the switching of the display screen of the meter 21, the driver is notified of that the non-public road mode 11b is currently selected. Further, by the operation of the lamp and the alarm, the people around the vehicle is notified of an abnormality visually or in an auditory manner.

Further, in Step S9, the control part 10 permits switching (for example, an intervention control to the front wheel and/or the rear wheel is turned off) between operation and non-operation of the ABS 30 and makes the operation level (intervention sensitivity) of the ABS 30 variable (switchable) by the operation of the mode changing switch 4.

Then, when the main switch 3 of the motorcycle 2 in the non-public road mode 11b is turned off, the control part 10 allows the travel mode 11 to return to the normal mode 11a and ends the process.

In the vehicle control system 1 of the present embodiment, when the non-public road mode 11b is selected, by performing the alarm operation using the safety protection component 20, it is possible to notify the driver and the vehicle surroundings of that the motorcycle 2 is in the non-public road mode 11b. That is, when the safety protection component 20 is attached, and a public road travel is performed while maintaining a state in which the non-public road mode 11b is selected, the safety protection component 20 performs the alarm operation, and thereby, an alarm is emitted to both the driver and surrounding people. Thereby, it is possible to prevent the driver from erroneously traveling on the public road while maintaining the non-public road mode 11b. In order to release the alarm operation of the safety protection component 20, it is necessary for the driver to remove the safety protection component 20 and obtain a state that is dedicated to the non-public road region, or release the non-public road mode 11b.

In the motorcycle 2, the engine 15 is stopped in a case where a side stand is raised and in a case of falling in addition to the engine 15 being stopped by turning off the main switch 3. In the motorcycle 2 that includes the smart key system 6, when the engine 15 is stopped in the non-public road region in which the smart key 6a is not carried, a control described below is performed in order to restart the engine 15.

That is, in a case where the engine 15 is stopped without turning off the main switch 3 in the non-public road mode 11b, when detecting that a prescribed operation is performed in a prescribed state, regardless of the reception situation of the radio waves of the smart key 6a, the control part 10 permits the restart of the engine 15 by the operation of the main switch 3. Examples of the "prescribed state" include that an elapsed time from when the engine 15 is stopped is within a predetermined period of time, and the like. Examples of the "prescribed operation" include inputting operations repeated several times to an existing operation element such as an accelerator grip, a brake operation element, or a clutch operation element, an operation to a dedicated restart operation element, or the like.

In the motorcycle 2, the prescribed operation being performed within a predetermined period of time from when the engine 15 is stopped is a condition of restarting the engine 15; however, the condition may be as follows. That is, for example, when the motorcycle 2 is in the prescribed state, the restart of the engine 15 may be permitted only by the operation of the main switch 3 regardless of the prescribed operation. Further, for example, when the prescribed operation is performed, the restart of the engine 15 may be permitted by the operation of the main switch 3 regardless of the prescribed state.

As described above, the vehicle control system 1 in the above embodiment is capable of switching the travel mode 11 of the motorcycle 2, the vehicle control system 1 including the control part 10 in which the public road mode 11a that is selected at the time of traveling on the public road and the non-public road mode 11b of the setting that is suitable for the travel in the non-public road region are set as the travel mode 11, wherein the control part 10 allows the safety protection component 20 of the motorcycle 2 to perform the normal operation that is required at the time of traveling on the public road when the public road mode 11a is selected and allows the safety protection component 20 to perform the alarm operation that is different from the normal operation when the non-public road mode is selected.

According to the configuration, by using an existing safety protection component 20, it is possible to announce that the vehicle is selecting the non-public road mode 11b without using a novel component (without increasing the number of components). Therefore, it is possible to prompt the driver and surrounding people to become aware that the vehicle is in the non-public road mode 11b and to prevent erroneously traveling on the public road in the non-public road mode 11b.

In the above vehicle control system 1, the alarm operation of the safety protection component 20 is an operation that visually or in an auditory manner notifies at least one of the driver and vehicle surroundings of an abnormality.

According to the configuration, not only the driver but also the vehicle surroundings are notified of the abnormality, and thereby, it is possible to effectively prevent erroneously traveling on the public road in the non-public road mode 11b.

In the above vehicle control system 1, the alarm operation of the safety protection component 20 continues during selecting the non-public road mode 11b.

According to the configuration, the alarm operation of the safety protection component 20 is continued during selecting the non-public road mode 11b, and thereby, it is possible to further effectively prevent erroneously traveling on the public road in the non-public road mode 11b.

In the above vehicle control system 1, the safety protection component 20 includes at least one of the winker 22, the horn 23, the meter 21, the headlight 24, the stop lamp 25, and the tail lamp 26.

According to the configuration, without using a novel component (without increasing the number of components), by using the existing safety protection component 20, it is possible to widely announce that the vehicle is selecting the non-public road mode 11b.

In the above vehicle control system 1, the alarm operation includes at least one of an intermittent operation of the horn 23 and a blinking operation of at least one of the winker 22, the meter 21, the headlight 24, the stop lamp 25, and the tail lamp 26.

According to the configuration, it is possible to further clearly announce that the vehicle is selecting the non-public road mode 11b by the intermittent operation or the blinking operation of the safety protection component 20.

In the above vehicle control system 1, the alarm operation includes at least one of blinking the winker 22 alternately from side to side, blinking the headlight 24, and turning off or blinking the vehicle speed display of the meter 21.

According to the configuration, by performing the alarm operation that is obviously different from the normal operation of the safety protection component 20, it is possible to still further clearly announce that the vehicle is selecting the non-public road mode 11b.

The above vehicle control system 1 includes the smart key system 6 that performs a communication between the motorcycle 2 and the smart key 6a which is portable by the driver and performs locking and unlocking of each part of the vehicle based on the result of the communication, wherein the control part 10 determines whether or not selection of the non-public road mode 11b is permitted in accordance with the reception situation of radio waves that are emitted by the smart key 6a.

According to the configuration, by using the existing vehicle equipment (the smart key 6a), without using a novel component (without increasing the number of components), it is possible to prevent erroneously traveling on the public road in the non-public road mode 11b.

In the above vehicle control system 1, the control part 10 permits the selection of the non-public road mode 11b at the time of traveling in a situation in which the radio waves that are emitted by the smart key 6a is not received.

According to the configuration, by permitting the selection of the non-public road mode 11b in a situation in which the smart key 6a possessed at the time of starting the engine 15 is left to be away from the motorcycle 2 (that is, in a situation which is impossible at the time of traveling on the public road), it is possible to prevent the driver from erroneously selecting the non-public road mode 11b during traveling on the public road. Further, since it is possible to release the smart key 6a at the time of traveling on the non-public road, it is possible to further comfortably travel without carrying personal belongings at the time of traveling on the non-public road.

In the above vehicle control system 1, the control part 10 permits the selection of the non-public road mode 11b when the radio waves that are emitted by the smart key 6a are not received for a certain period of time.

According to the configuration, when the radio waves that are emitted by the smart key 6a are not received temporarily due to a radio wave transmission failure of the smart key 6a, the effect of external environments, and the like, it is possible to prevent the selection of the non-public road mode 11b from being permitted erroneously.

In the above vehicle control system 1, the control part 10 permits the selection of the non-public road mode 11b when stopping in a situation in which the radio waves that are emitted by the smart key 6a are not received.

According to the configuration, by permitting the switching to the non-public road mode 11b when the traveling motorcycle 2 stops in a situation in which the radio waves that are emitted by the smart key 6a are not received, it is possible to further safely perform the switching operation of the travel mode 11.

In the above vehicle control system 1, the control part 10 sets the travel mode 11 to the public road mode 11a when the main switch 3 of the motorcycle 2 is turned off. According to the above configuration, since the non-public road mode 11b is released simultaneously with turning off of the main switch 3 even when the non-public road mode 11b is not released by a switch operation or the like, it is possible to save the time and effort for releasing the non-public road mode 11b, and it is possible to prevent traveling in the non-public road mode 11b erroneously at the time of restarting after turning off the main switch 3.

In the above vehicle control system 1, when the engine 15 is stopped at the time of traveling in the non-public road mode 11b, the control part 10 permits the restart of the engine 15 by at least one of the prescribed state and the prescribed operation regardless of the reception situation of the radio waves of the smart key 6a.

According to the configuration, even if the smart key 6a is not carried when the engine 15 is stopped due to falling or the like during traveling in the non-public road mode 11b, for example, by performing the prescribed operation within a predetermined period of time (about 30 seconds), it is possible to restart the engine 15 and travel. Further, since it is impossible to restart the engine 15 by a state (for example, after the predetermined period of time) other than the prescribed state and/or by an operation other than the prescribed operation, even when the driver is away from the motorcycle 2 of which the engine 15 is stopped in the non-public road mode 11b, it is possible to prevent a third party from restarting the engine 15 and to obtain an antitheft property.

The present invention is not limited to the above embodiment. For example, the present system is not limited to an application to the motorcycle and can be widely applied to a saddle riding type vehicle. The saddle riding type vehicle includes all vehicles on which a driver straddles a vehicle body and includes not only a motorcycle (including a motorized bicycle and a scooter-type vehicle) but also a three-wheeled vehicle (including a vehicle having two front wheels and one rear wheel in addition to a vehicle having one front wheel and two rear wheels) or a four-wheeled vehicle. Further, the present invention may be applied to an automobile having a vehicle room.

The configuration in the above embodiment is an example of the invention, and various changes such as substitution of the configuration element of the embodiment by a known configuration element can be made without departing from the scope of the invention.

What is claimed is:

1. A vehicle control system capable of switching a travel mode of a vehicle, the vehicle control system comprising:
    a smart key system that performs a communication between the vehicle and a smart key which is portable by a driver and performs locking and unlocking of each part of the vehicle based on a result of the communication; and
    a hardware controller executing software, hardware including circuitry, or a cooperation of the software and the hardware configured to set, as the travel mode, a public road mode or a non-public road mode,
    wherein the public road mode is selected at a time of traveling on a public road and the non-public road mode is selected at a time of traveling on a non-public road region,
    wherein the hardware controller, the hardware including the circuitry, or the cooperation of the software and the hardware facilitates a normal operation of at least one of a group consisting of a winker, a horn, a meter, a headlight, a stop lamp, and a tail lamp of the vehicle when the public road mode is selected and facilitates an alarm operation of the at least one of the group consisting of the winker, the horn, the meter, the headlight, the stop lamp, and the tail lamp when the non-public road mode is selected, wherein the alarm operation is different from the normal operation, wherein
    the alarm operation is an operation that notifies at least one of the group consisting of the driver and vehicle surroundings of an abnormality that indicates the vehicle is in the non-public road mode, and
    wherein the hardware controller, the hardware including the circuitry, or the cooperation of the software and the hardware determines whether or not selection of the non-public road mode is permitted in accordance with a reception situation of a radio wave that is emitted by the smart key.

2. The vehicle control system according to claim 1, wherein the at least one of the group consisting of the winker, the horn, the meter, the headlight, the stop lamp, and the tail lamp continues during selecting the non-public road mode.

3. The vehicle control system according to claim 1, wherein the alarm operation includes an intermittent operation of the horn.

4. The vehicle control system according to claim 1, further comprising an operation detection means capable of detecting whether the vehicle is in a travel state, wherein the hardware controller, the hardware including the circuitry, or the cooperation of the software and the hardware facilitates the selection of the non-public road mode at a time of traveling in a situation in which the radio wave that is emitted by the smart key is not received.

5. The vehicle control system according to claim 4, wherein the hardware controller, the hardware including the circuitry, or the cooperation of the software and the hardware facilitates the selection of the non-public road mode when the radio wave that is emitted by the smart key is not received for a certain period of time.

6. The vehicle control system according to claim 4, wherein the hardware controller, the hardware including the circuitry, or the cooperation of the software and the hardware facilitates the selection of the non-public road mode when stopping in a situation in which the radio wave that is emitted by the smart key is not received.

7. The vehicle control system according to claim 1, wherein the hardware controller, the hardware including the circuitry, or the cooperation of the software and the hardware sets the travel mode to the public road mode when a main switch of the vehicle is turned off.

8. The vehicle control system according to claim 1, wherein when an engine is stopped at a time of traveling in the non-public road mode, the hardware controller, the hardware including the circuitry, or the cooperation of the software and the hardware permits a restart of the engine by at least one of the group consisting of a prescribed state and a prescribed operation regardless of a reception situation of a radio wave of the smart key.

9. The vehicle control system according to claim 1, wherein the alarm operation is an operation that notifies in an auditory manner based on an intermittent operation of the horn.

10. The vehicle control system according to claim 1, wherein the alarm operation is an operation that notifies in a visual manner based on alternative blinking of the winker.

11. The vehicle control system according to claim 1, wherein the alarm operation is an operation that notifies in a visual manner based on blinking of the headlight.

12. The vehicle control system according to claim 1, wherein the alarm operation is an operation that notifies in a visual manner based on blinking of the tail lamp.

13. The vehicle control system according to claim 1, wherein the alarm operation is an operation that notifies in a visual manner based on blinking of the stop lamp.

14. The vehicle control system according to claim 1, wherein the alarm operation is an operation that notifies in a visual manner based on switching of a display screen of the meter.

* * * * *